May 5, 1925.
T. B. POLK
1,536,526
WINDOW CLEANER
Filed Sept. 15, 1922
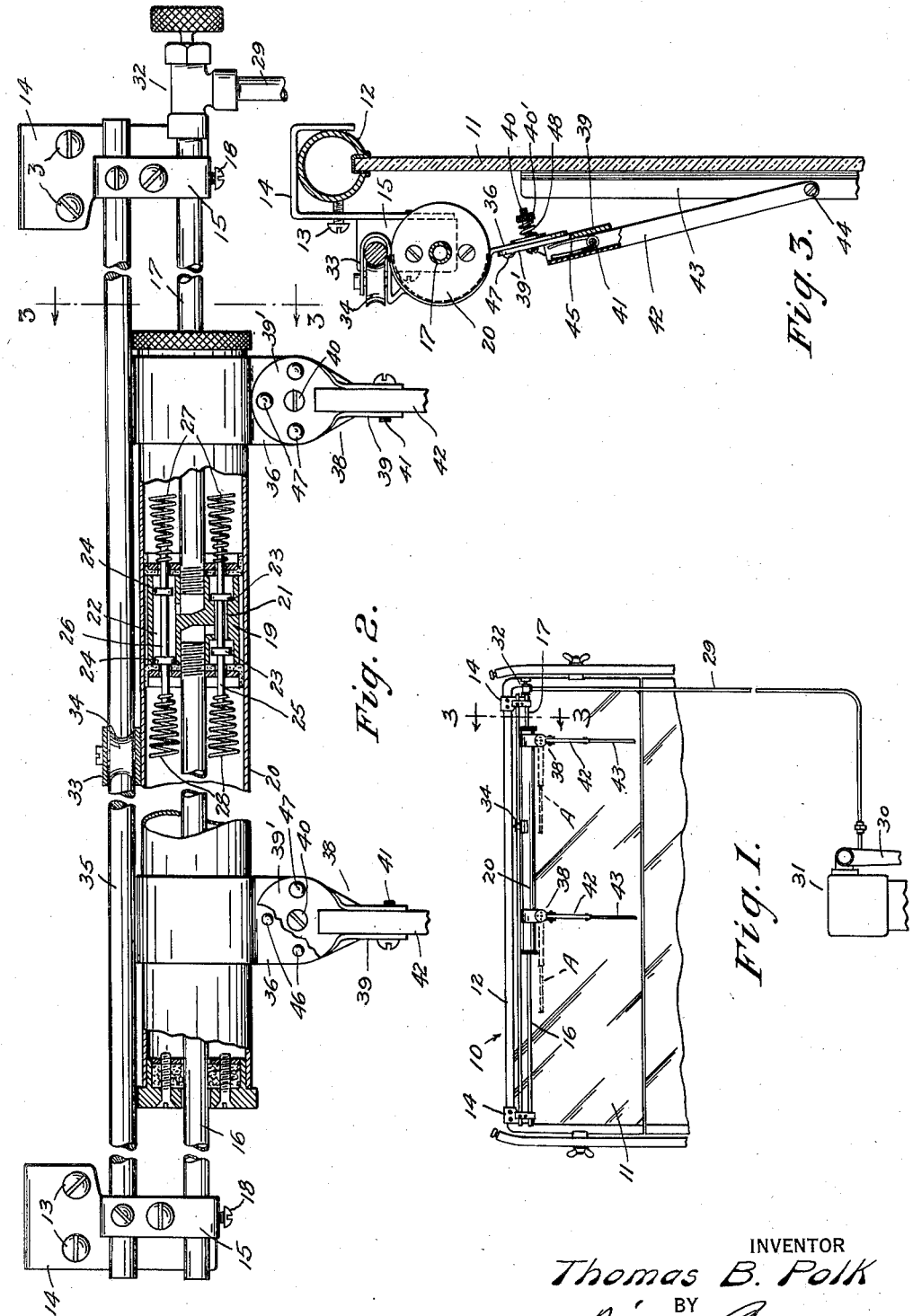
INVENTOR
Thomas B. Polk
BY
Pierre Barnes
ATTORNEY Patented May 5, 1925.

1,536,526

UNITED STATES PATENT OFFICE.

THOMAS B. POLK, OF SEATTLE, WASHINGTON.

WINDOW CLEANER.

Application filed September 15, 1922. Serial No. 588,377.

*To all whom it may concern:*

Be it known that I, THOMAS B. POLK, a citizen of the United States, residing at Seattle, in the county of King and State of Washington, have invented certain new and useful Improvements in Window Cleaners, of which the following is a specification.

This invention relates to power operated devices for cleaning windows or windshields of trolley cars, automobiles, or the like, and more especially to improvements to the cleaning apparatus disclosed in the patent of Henry Hueber, No. 1,437,521, issued December 5, 1922.

The object of my improvements is the perfecting of cleaning apparatus of this character to render the same more convenient and efficient in use.

More specific objects and advantages of the invention will appear in the following description.

The invention is illustrated in the accompanying drawings, in which,—

Figure 1 is a front elevation of the cleaning device in its preferred form applied to the windshield of an automobile; Fig. 2 is an enlarged front elevation of the cleaning device, partly broken away and partly in section; and Fig. 3 is a sectional view through line 3—3 of Figs. 1 and 2.

Referring to Figs. 1, 2 and 3, the numeral 10 represents the upper member of an automobile windshield having a glass plate 11 within a frame which includes a top rail 12 as usual.

Engaging over the frame rail 12 and secured thereto, as by set screws 13, are hooks 14 on which are secured apertured blocks 15 through which respectively extend horizontal axially aligned tubular rods 16 and 17. These rods are secured as by means of set screws 18 to said blocks and the ends of rods adjacent to each other are secured within the ends of a chambered piston 19. On said piston and the rods 16, 17 is mounted to slide a cylinder 20 which constitutes the movable member of a pneumatic motor. The piston is provided with a chamber 21 which communicates with the tubular rod 16 and also through ports with the spaces in the opposite ends of the cylinder. A second chamber 22 within the piston communicates with the other tubular rod 17 and through ports with said cylinder spaces. Duplex valves 23 and 24 are provided for the ports of the respective chambers, the complementary valves being secured to stems 25 and 26 which protrude from the piston ends and have secured thereto buffer springs 27 and 28.

The tubular rod 16 is open to the atmosphere and the other tubular rod 17 is connected by a pipe 29 with the intake manifold as 30, Fig. 1, of the propelling engine 31 of the vehicle to the windshield of which the cleaning device is applied. Included in the communicative connections between said cylinder and the manifold 30 is a valve 32 whereby suction afforded by the engine to the cylinder may be regulated.

The cylinder is caused to travel in one direction by the pressure of the atmosphere admitted through rod 16 into one end of the cylinder when the air has been withdrawn through the rod 17 from the other end of the cylinder. Near the end of its travel the cylinder engages the buffer springs 27 or 28 whereby the valves 23 and 24 are influenced to reverse the flow of air to and from the cylinder which effects a reverse travel of the latter, and so on.

Secured to the top of said cylinder and at above its mid-length is a bracket 33 in which is journaled a vertically disposed axle for a trolley wheel 34 which, as shown in Figs. 1, 2 and 3, tracks against a bar 35 disposed parallel to the axis of said cylinder and having its ends secured in the block 15.

Rigid with said cylinder and extending downwardly from near each end of the same is a lug 36 which is disposed substantially radially with respect to the cylinder axis.

38 represent coupling members each of which is formed of a plate to provide a channeled element 39 depending from a substantially disk shaped upper portion $39^1$ which at about their respective centers are pivotally connected to the lugs 36 by means of headed screws 40.

Pivotally connected to the elements 39 by means of pins 41 are depending arms 42 to the lower ends of which squeegees 43 are pivotally connected by means of pins 44. A spring 45 Fig. 3, provided for each of the couplings 38 at its connection with an arm 42 serves to resiliently retain the associated squeegee in contact with the windshield glass 11.

Upon each of the lugs 36 is provided one or more protuberances 46 which are engageable in recesses provided in the complementary disk portion $39^1$ of the coupling, said recesses being preferably formed by pressing the material outwardly as at 47.

A spring, such as 48 Fig. 3, surrounding a screw 40 between the nut 40¹ therefor and the associated coupling 36 serves to yieldingly retain the latter in position to have the recesses thereof engage the protuberances 46 for maintaining the squeegees in substantially vertical operative positions, as shown by full lines in Fig. 1, or in their horizontal positions as indicated by broken lines A when the device is not being employed.

With the valve 32 in its open position the suction obtaining in the engine manifold 30 (Fig. 1) creates a partial vacuum in one end of the cylinder 20 which coacts with the atmospheric pressure in the other end of the cylinder to cause the latter to be driven axially for propelling the squeegee to one side of the windshield. When the cylinder approaches the termination of such travel or stroke the springs, 27 or 28, are encountered by a cylinder end to effect a shifting of the valves 23 and 24 whereby the action of the air and vacuum in the cylinder is changed to opposite ends thereof and the cylinder is thereupon caused to travel in a reverse direction from its preceding stroke. The travel of the cylinder thus regulates the valves 23 and 24 to enable the power medium to reverse the movements of the cylinder and impart reciprocatory motion to the cylinder with a corresponding travel of the squeegee against the glass 11 to clean the same.

The wheel 34 acts in opposition to the squeegee to maintain them in contact with the glass and subject to the resiliency of the springs 45 of the respective arms 42.

When the cleaner above described is not in use the operator may swing the arms 42 and the attached squeegees into positions indicated by dotted lines A in Fig. 1 so as not to obstruct the view through the windshield.

What I claim, is,—

1. A window cleaning device having a member mounted for reciprocatory movement, a cleaning element adapted to be carried by said member across a window, a spring tending to press said cleaning element against the window, and means included in the connection between said member and the cleaning element whereby the latter may be retained selectively in positions parallel with or at right angles with respect to the direction of travel of said member.

2. A window cleaning device having a cylinder mounted for reciprocatory movements across a window, a support for said cylinder comprising a stationary rod extending axially through both ends of the cylinder, a cleaning element, an arm therefor depending from and carried by said cylinder, a stationary guide rod disposed at a higher elevation than the cylinder and in parallel relations with the aforesaid rod, and a wheel carried by said cylinder and tracking against said guide rod.

3. A window cleaning device as defined in claim 2 wherein the arm is pivotally connected with the cylinder for positioning the cleaning element in parallel or angular relations selectively with respect to the cylinder, and means for releasably securing the arm in its adjusted positions.

4. A window cleaning device comprising a cylinder, a stationary support on which said cylinder is reciprocable, said supporting member extending thru and projecting from both ends of the cylinder, a cleaner element depending from and carried by the cylinder, a guide rod mounted in parallelism with said support, and means carried by the cylinder and disposed to cooperate with the guide rod to prevent rotation of the cylinder.

5. In a windshield cleaner for a motor vehicle provided with an internal combustion engine, the combination of a cylinder, a stationary tubular support for said cylinder extending through both ends of the latter and having a piston within said cylinder, communicative connections between one end of said support and the intake manifold of said engine to afford power for reciprocating the cylinder, a cleaner element depending from and carried by the cylinder, a guide rod mounted in parallelism with the tubular support, and a grooved roller carried by the cylinder and engaging said rod for preventing rotation of the cylinder.

Signed at Seattle, Washington, this 3rd day of August 1922.

THOMAS B. POLK.

Witnesses:
PIERRE BARNES,
JOHN L. CHURCHILL.